United States Patent [19]
Moerman

[11] Patent Number: 6,092,929
[45] Date of Patent: Jul. 25, 2000

[54] OPTICAL DEVICE STORAGE SYSTEM

[76] Inventor: David E. Moerman, 4401 W. Butler Dr., Glendale, Ariz. 85302

[21] Appl. No.: 09/178,992

[22] Filed: Oct. 26, 1998

[51] Int. Cl.[7] .................................................. B65D 33/14
[52] U.S. Cl. ..................... 383/24; 150/108; 206/316.3; 224/909; 359/407
[58] Field of Search .................................. 359/407, 480, 359/481, 482; 383/15, 24; 224/217–222, 909; 150/108, 110; 206/316.3

[56] References Cited

U.S. PATENT DOCUMENTS

| D. 249,592 | 9/1978 | Libonati | D87/3 R |
|---|---|---|---|
| D. 288,743 | 3/1987 | Taylor | D3/106 |
| 4,865,191 | 9/1989 | Easter | 206/316.3 |
| 5,170,917 | 12/1992 | Tourigny | 224/221 |
| 5,936,766 | 8/1999 | Speicher | 359/409 |

*Primary Examiner*—Stephen P. Garbe

[57] ABSTRACT

An optical device storage system for storing and transporting with the optical device miscellaneous items including lens covers, lens caps, lens tissues, and keys. The storage system includes a substantially rectangular pouch structure which is sized for placement between the monocular barrels of a binoculars device. The pouch structure includes an opening for providing access to an interior compartment. An attaching element is provided on each side portion of the pouch structure for attaching the storage system to each monocular barrel of the optical device. The opening is provided with a zipper-type closure device for maintaining the miscellaneous items within the interior compartment.

12 Claims, 2 Drawing Sheets

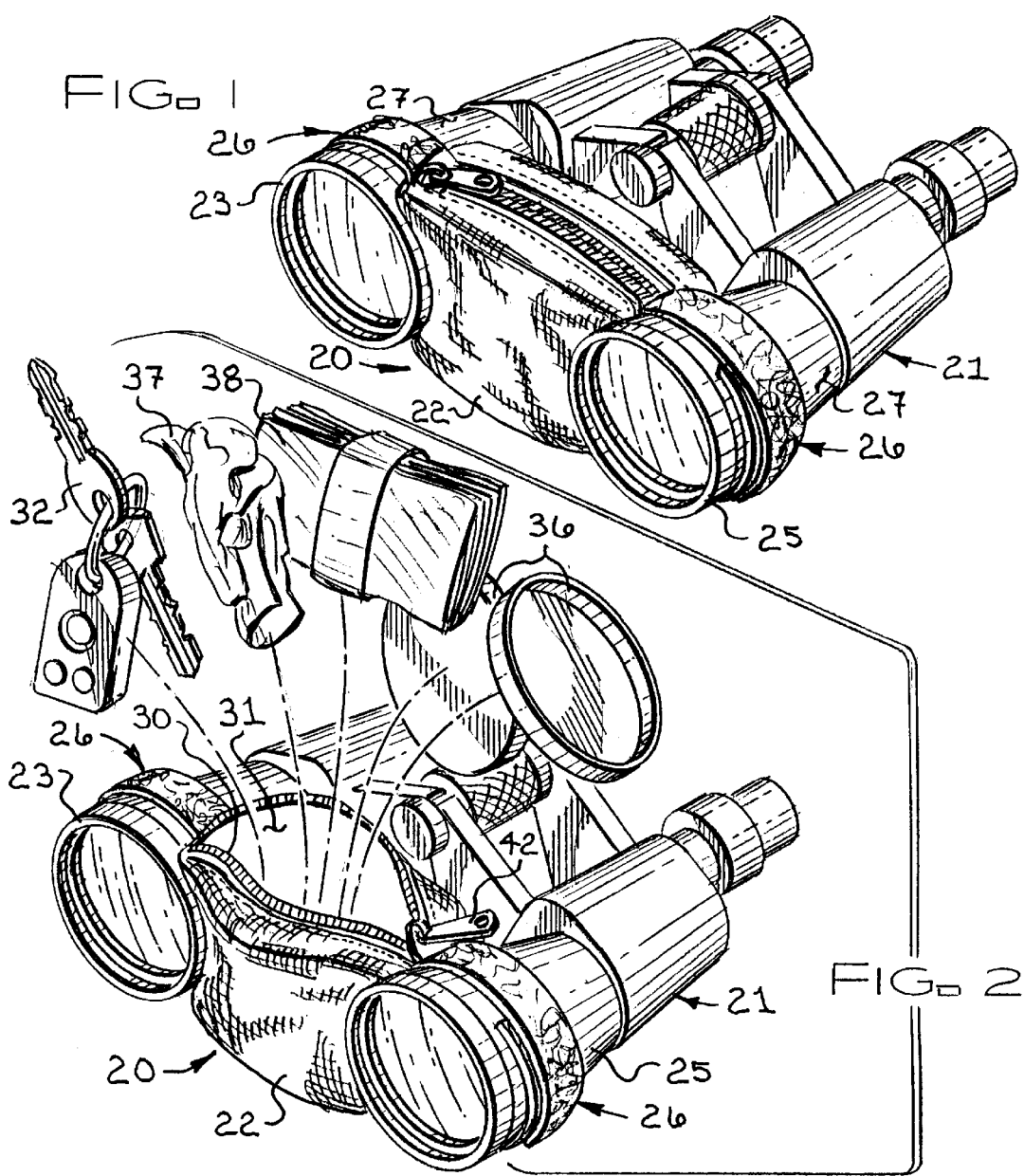
FIG. 1
FIG. 2
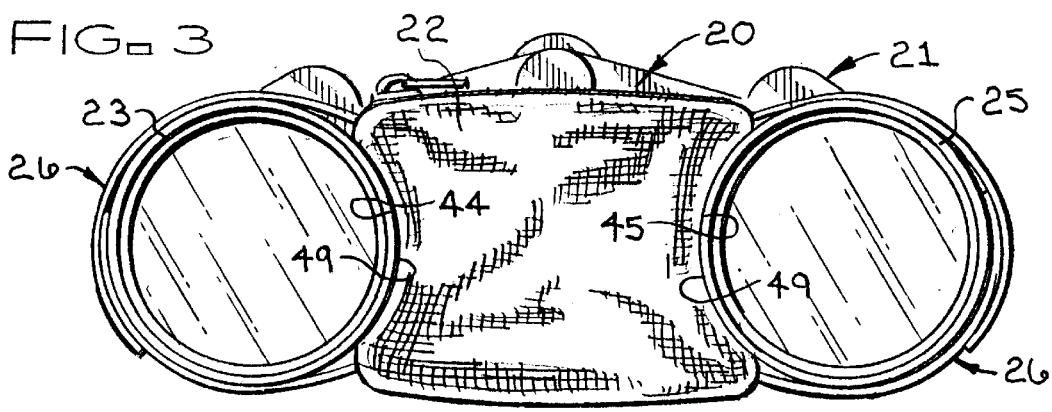
FIG. 3

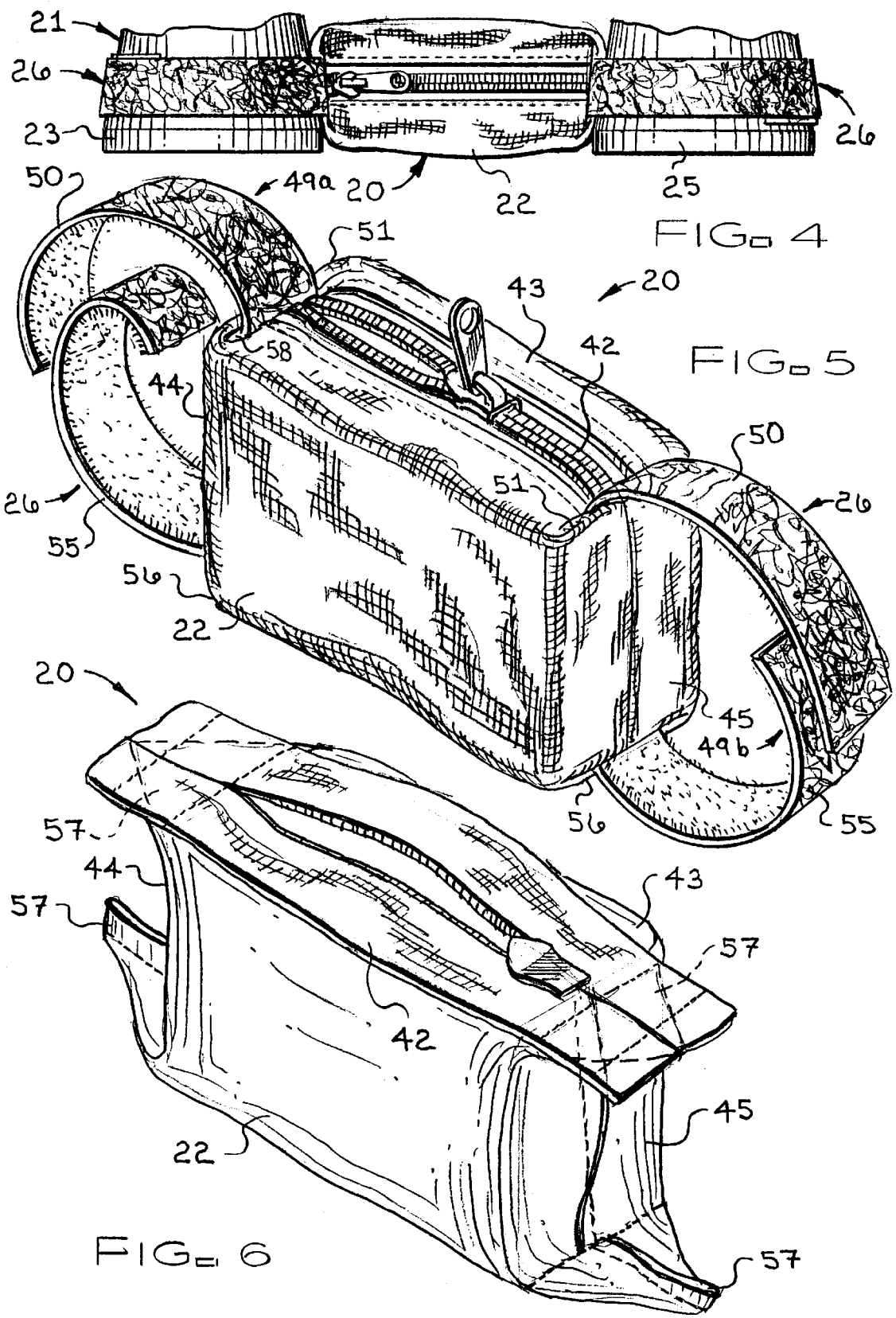

OPTICAL DEVICE STORAGE SYSTEM

BACKGROUND OF THE INVENTION

1. Field of the Invention

This invention relates to providing an optical device storage system. More particularly, this invention concerns such a storage system which is removably attached to each monocular barrel of a binoculars device and is capable of securing a variety of items such as keys, lens covers, lens cleaner, and the like.

2. Description of the Prior Art

Typically, optical devices such as binoculars are used by individuals for engaging in a variety of activities such as hiking, sightseeing, hunting, and law enforcement activities. To protect the lenses, optical devices typically are provided with lens caps which are normally attached to the lens housing by pressure fitting or other such retaining method. In addition, to provide for optimal use and enjoyment of the optical device, other items such as lens cleaner and lens tissue are often required.

Often times when a user attempts to use the optical device, there is no convenient place to put the lens caps. The user may attempt to place the caps in a pocket, which is often uncomfortable, or on a nearby object which may result in the caps being dropped, lost or forgotten. Furthermore, items such as lens cleaner and lens tissue are often never brought on the excursion since there is no convenient place to store these items. Thus there exists an unmet need for a storage system which may be removably attached to an optical device, especially binoculars, and into which may be stored not only those items which are incident to the use and enjoyment of the optical device, but also other miscellaneous items, such as keys, which may be conveniently stored in such storage device.

OBJECTS OF THE INVENTION

A primary object of the present invention is to fulfill the above-mentioned needs and overcome the above-mentioned problems by the provision of a storage system which may be removably attached to an optical device. A further primary object of the present invention is to provide such a storage system which is inexpensive, easy to use, and easy to make. Other objects of this invention will become apparent with reference to the following invention descriptions.

SUMMARY OF THE INVENTION

According to a preferred embodiment of the present invention, this invention provides a storage system for conveniently storing and transporting miscellaneous items while using an optical device having at least one monocular barrel, such storage system comprising, in combination: holding means for holding such items; such holding means comprising supportive positioning means for supportive positioning of an exterior of such holding means adjacent a portion of an exterior cylindrical surface of such monocular barrel; and attachment means for attaching such holding means to such optical device; whereby a variety of such miscellaneous items are conveniently carried with such optical device and are quickly accessible for use.

In addition, this invention provides such a storage system wherein such holding means comprises a pouch structure having a closable opening for providing access to an interior compartment. This invention further provides such a storage system wherein such pouch structure is substantially rectangular in shape; and, further, wherein such attachment means comprises a strap means for attaching such pouch structure to such monocular barrel, such strap means being structured and arranged to grip such exterior cylindrical surface of such monocular barrel.

Even further, in accordance with a preferred embodiment thereof, this invention provides for a storage system for conveniently storing and transporting miscellaneous items while using a binoculars having a first monocular barrel and a second monocular barrel, such storage system comprising, in combination: holding means for holding such items; such holding means comprising supportive positioning means for supportive positioning of an exterior of such holding means adjacent a portion of an exterior cylindrical surface of such first monocular barrel and such second monocular barrel; and attachment means for attaching such holding means to such binoculars; whereby a variety of such miscellaneous items are conveniently carried with such binoculars and are quickly accessible for use.

Additionally, the present invention provides for such a storage system wherein such holding means comprises a pouch structure having a substantially longitudinal top portion, a first side wall having an upper side wall portion and a lower side wall portion, and a second side wall having an upper side wall portion and a lower side wall portion, such pouch structure further having an opening for providing access to an interior compartment. And, further, it provides such a storage system wherein such opening is structured and arranged to substantially span such longitudinal top portion. Yet further, it provides such a system wherein such opening is closeable; and, further still, wherein such opening is zipper closeable.

Yet additionally, it provides for such a storage system wherein such attachment means comprises strap means for attaching such pouch structure to each of such first monocular barrel and such second monocular barrel. This invention further provides such a storage system wherein such strap means comprises: a first connector comprising an elongated first upper connector member structured and arranged for attachment adjacent such upper side wall portion of such first side wall; and an elongated first lower connector member structured and arranged for attachment adjacent such lower side wall portion of such first side wall; wherein such first upper connector member and such first lower connector member are structured and arranged to grip such first monocular barrel; and a second connector comprising an elongated second upper connector member structured and arranged for attachment adjacent such upper side wall portion of such second side wall; and an elongated second lower connector member structured and arranged for attachment adjacent such lower side wall portion of such second side wall; wherein such second upper connector member and such second lower connector member are structured and arranged to grip such second monocular barrel.

Further, this invention provides for such a storage system further comprising a clasping means for releasably clasping such first upper connector member to such first lower connector member, and for releasably clasping such second upper connector member to such second lower connector member. And it provides such a storage system wherein such clasping means comprises a hook-and-loop-type connector.

Further still, in accordance with a preferred embodiment thereof, this invention provides for a storage system for conveniently storing and transporting miscellaneous items while using a binoculars having a first monocular barrel and a second monocular barrel, such storage system comprising, in combination: a substantially rectangular pouch structure having a substantially longitudinal top portion, a first side wall having an upper side wall portion and a lower side wall portion, and a second side wall having an upper side wall portion and a lower side wall portion, such pouch structure further having an opening for providing access to an interior compartment; such pouch structure comprising supportive positioning means for supportive positioning of an exterior of such holding means adjacent a portion of an exterior cylindrical surface of such first monocular barrel and such second monocular barrel; a first connector comprising: an elongated first upper connector member structured and arranged for attachment adjacent such upper side wall portion of such first side wall; and an elongated first lower connector member structured and arranged for attachment adjacent such lower side wall portion of such first side wall; wherein such first upper connector member and such first lower connector member are structured and arranged to grip such first monocular barrel; and a second connector comprising: an elongated second upper connector member structured and arranged for attachment adjacent such upper side wall portion of such second side wall; and an elongated second lower connector member structured and arranged for attachment adjacent such lower side wall portion of such second side wall; wherein such second upper connector member and such second lower connector member are structured and arranged to grip such second monocular barrel; and wherein such opening is closeable; and, further, wherein such opening is zipper closeable; and, further still, wherein each of such first connector and such second connector comprise a hook-and-loop-type connector.

Yet additionally, in accordance with a preferred embodiment thereof, this invention provides for a method of providing an optical device storage system for conveniently storing and transporting miscellaneous items while using an optical device, comprising, in combination, the steps of: providing a substantially-rectangular piece of pouch material having a first longitudinal end, a second longitudinal end, a top edge and a bottom edge; folding such piece of pouch material so that such top edge is substantially aligned with such bottom edge, thereby providing for an overlapping first longitudinal end and an overlapping second longitudinal end; providing an open-top pouch structure having an interior portion, comprising the subsequent steps of: sealing such overlapping first longitudinal end thereby forming a closed first end having a first top corner and a first bottom corner, and sealing such overlapping second longitudinal end thereby forming a closed second end having a second top corner and a second bottom corner; attaching a fastener adjacent such aligned top edge and such bottom edge; drawing such first top corner and such first bottom corner equidistantly into such interior portion thereby forming a first side top fold and a first side bottom fold; inserting an end of an upper connector member into such first side top fold, and inserting an end of an lower connector member into such first side bottom fold; and attaching such end of such upper connector member to such first top corner, and attaching such end of such lower connector member to such first bottom corner.

Even further, this invention provides such a method of providing an optical device storage system further comprising the step of drawing such second top corner and such second bottom corner equidistantly into such interior portion thereby forming a second side top fold and a second side bottom fold. And, it further provides such a method of providing an optical device storage system further comprising the step of inserting an end of a second upper connector member into such second side top fold, and inserting an end of a second lower connector member into such second side bottom fold; also, it provides such a method of providing an optical device storage system further comprising the step of attaching such end of such second upper connector member to such second top corner, and attaching such end of such second lower connector member to such second bottom corner.

BRIEF DESCRIPTION OF THE DRAWINGS

FIG. 1 is a perspective view illustrating a typical binoculars device on which is mounted a preferred embodiment of the storage system of the present invention.

FIG. 2 is an exploded perspective view of the binoculars-mounted storage system illustrating possible contents which may be stored therein.

FIG. 3 is a front elevation view of the binoculars-mounted storage system of FIG. 1.

FIG. 4 is a top view of the binoculars-mounted storage system of FIG. 1.

FIG. 5 is a perspective view of the preferred embodiment of the storage system.

FIG. 6 is an inside-out perspective view of the preferred embodiment of the storage system illustrating a preferred method of assembly.

DETAILED DESCRIPTION OF A PREFERRED EMBODIMENT AND THE BEST MODE OF PRACTICE

Referring now to the drawings, FIGS. 1–4 illustrate a preferred embodiment of the optical device storage system 20 (herein referred to as storage system) which is attached to binoculars 21 and which is structured and arranged to carry a variety of miscellaneous items when the particular optical device is in use. It is to be understood that though the preferred method of practicing the present invention is with a binoculars-type optical device, other varieties of optical devices, such as spotting scopes, may also be used within this invention.

As shown in perspective in FIG. 1, the storage system 20 preferably comprises a substantially rectangular pouch structure 22 (embodying herein a holding means for holding such items) which is structured and arranged for removable attachment to, and to substantially span the distance between, the first or left monocular barrel 23 and the second or right monocular barrel 25. Though the structural details of the storage system 20 will be more fully disclosed hereinafter with respect to FIGS. 5–6, it is important to disclose at this time that the storage system 20 is provided with a pair of connectors 26, preferably hook-and-loop-type connectors such as those commercially available under the VELCRO (TM) trademark, which are structured and arranged to firmly abut the exterior perimeter surface 27 of each respective monocular barrel 23 and 25. The connectors 26 embody herein an attachment means for attaching such holding means to such optical device; and wherein such attachment means comprises strap means for attaching such pouch structure to each of such first monocular barrel and such second monocular barrel. Due to the fact that binoculars come in a variety of sizes and shapes, it is also preferred that each of the connectors 26 be adjustable so as to allow for variations in both the diameter of, and the spacing between, the monocular barrels 23 and 25.

As shown in exploded perspective in FIG. 2, the pouch structure 22 comprises an opening 30 for providing access to an interior portion or interior compartment 31 into which an assortment of items may be conveniently placed. A representative sample of miscellaneous items which may be stored in the storage system 20 include keys 32, lens covers 36, lens cleaner 37, and lens tissues 38. The advantages of the storage system 20 are most clearly obvious when used in conjunction with those items which are typically associated with the use and enjoyment of the binoculars such as the lens covers 36, lens cleaner 37, and lens tissues 38. These items may either get lost or be forgotten if not stored and/or transported with the particular optical device. To prevent accidental dislodging of the various above mentioned items from the interior compartment 31, the opening 30 is provided with a fastener 42, preferably a zipper-type fastener, which is preferably located along the longitudinal top portion 43 (as shown best in FIG. 5) of pouch structure 22.

Shown in FIGS. 3–4 are a front elevation and top view, respectively, of the storage system 20 mounted on the binoculars 21. It is preferred that the pouch structure 22 be provided with a flexible construction which allows the left side portion 44 and the right side portion 45 of the pouch structure 22 to conform to the inner portion 49 of the exterior perimeter surface 27 of each respective monocular barrel 23 and 25, thus providing for supportive positioning of the pouch structure adjacent each inner portion 49. This feature also allows for substantially unobstructed lateral adjustment of the monocular barrels 23 and 25 when the storage system 20 is attached to the binoculars 21. This arrangement embodies herein an arrangement wherein such holding means comprises supportive positioning means for supportive positioning of an exterior of such holding means adjacent a portion of an exterior cylindrical surface of such monocular barrel.

Shown is perspective in FIG. 5 is the preferred embodiment of the storage system 20 as previously illustrated and described in FIGS. 1–4. The storage system comprises a substantially rectangular pouch structure 22 preferably made of a nylon-type material and having a preferred longitudinal length of approximately 5 inches, a preferred transverse length of approximately 3.5 inches, and a preferred width of approximately 2 inches. It is to be understood that though the preferred dimensions of the pouch structure are as herein disclosed, such dimensions are exemplary only of preferred pouch dimensions for most present binoculars and do not in other ways limit the present invention.

Referring further to FIG. 5, the connectors 26 are attached, preferably by stitching, to each respective side portion 44 and 45. Each of the connectors 26 (comprising a first or left side connector 49*a* and a second or right side connector 49*b*) comprises an upper connector member 50 which is connected, preferably by stitching, adjacent to each top portion 51 of each respective left side portion 44 and right side portion 45. In addition, each of the connectors 26 further comprises a lower connector member 55 which is connected, preferably by stitching, adjacent to each bottom portion 56 of each respective left side portion 44 and right side portion 45. In the preferred embodiment, each respective upper and lower connector member 50 and 55 comprise hook-and-loop-type connectors such as those commercially available under the VELCRO (TM) trademark, having a preferred length of approximately 4.5 inches, and a preferred width of approximately 1 inch. Each VELCRO (TM) hook-and-loop-type connector member 50 and 55 embodies herein a clasping means for releasably clasping such left side or first upper connector member to such left side or first lower connector member, and for releasably clasping such right side or second upper connector member to such right side or second lower connector member.

Securing the storage system 20 to the binoculars 21 is both a quick and easy process. With the pouch structure 22 placed between each respective monocular barrel 23 and 25, preferably with the fastener 42 facing upwards, the upper and lower connectors 50 and 55 are manipulated so as to encircle each respective monocular barrel 23 and 25 and to provide a snug fit thereon (as shown best in FIG. 3). With the upper and lower connectors 50 and 55 snugly encircled around each respective monocular barrel 23 and 25, the upper and lower connectors 50 and 55 are pressed together, thereby engaging the "hook" and "loop" components of each respective VELCRO (TM) connector. This arrangement embodies herein an arrangement wherein such first upper connector member and such first lower connector member are structured and arranged to grip such first monocular barrel; and wherein such second upper connector member and such second lower connector member are structured and arranged to grip such second monocular barrel. It is to be understood that even though the preferred method of attaching the pouch structure 22 to the binoculars 21 is as illustrated and described, other methods may be used without deviating from the spirit of the present invention. Such other methods may include, but are not limited to, snap fasteners, buckles, and elastic bands.

Shown in FIG. 6 is a perspective inside-out view of the preferred storage system 20 of the present invention illustrating the preferred method of assembly. Formation of the pouch structure 22 is preferably accomplished by folding a substantially-rectangular piece of pouch material in half so that the material top edge (not shown) is substantially aligned with the material bottom edge (not shown). Each respective overlapping first and second longitudinal end or side portion 44 and 45 is then closed or sealed, preferably by stitching, thereby forming an open-top pouch structure 22.

Providing the pouch structure 22 with a substantially-rectangular shape requires that each respective side portion 44 and 45 be pulled inward, thereby creating corner portions 57, and corresponding corner portion folds 58 (shown best in FIG. 5), on each of the respective first or left side portion 44 and second or right side portion 45 of pouch structure 22. Alternatively, with the pouch structure 22 turned right-side-out, each of the respective corner portions 57 may be drawn equidistantly into the interior compartment 31, thereby providing the pouch structure 22 with a substantially-rectangular shape. Within the folds 58 formed by each of the corner portions 57 is placed an end (not shown) of each respective connector member 50 and 55. Each of the corner portions 57 is then sealed, preferably by stitching, thereby securing each respective connector member 50 and 55 to the pouch structure 22. To provide a closeable pouch structure 22, a fastener 42, preferably a zipper-type fastener, is attached, preferably by stitching, to the open longitudinal top portion 43.

Although applicant has described applicant's preferred embodiment of the this invention, it will be understood that the broadest scope of this invention includes such modifications as diverse shapes, sizes and materials. Such scope is limited only by the below claims as read in connection with the above specification. Further, many other advantages of applicant's invention will be apparent to those skilled in the art from the above descriptions and the below claims.

What is claimed is:

1. A storage system attached to binoculars comprising, in combination:

a. a binoculars comprising a first monocular barrel and a second monocular barrel;

b. a pouch structure, having opposed ends and an interior compartment, located between said first monocular barrel and said second monocular barrel, each of said ends being adjacent to one of said barrels; and c. a first connector attached to said pouch structure and removably attached to said first monocular barrel.

2. The storage system according to claim 1 wherein said pouch structure comprises a closable opening to said interior compartment.

3. The storage system according to claim 2 wherein said pouch structure is substantially rectangular in shape.

4. The storage system according to claim 1 further comprising a second connector attached to said pouch structure and removably attached to said second monocular barrel.

5. The storage system according to claim 4 wherein said pouch structure comprise a substantially longitudinal top portion, a first side wall having an upper side wall portion and a lower side wall portion, and a second side wall having an upper side wall portion and a lower side wall portion, said pouch structure further comprising an opening for providing access to said interior compartment.

6. The storage system according to claim 5 wherein said opening is structured and arranged to substantially span said longitudinal top portion.

7. The storage system according to claim 5 wherein said opening is closeable.

8. The storage system according to claim 7 wherein said opening is zipper closeable.

9. The storage system according to claim 5 wherein said connectors comprises strap means for attaching said pouch structure to each of said first monocular barrel and said second monocular barrel.

10. The storage system according to claim 9 wherein said strap means comprises:

a. a said first connector comprising
   i. an elongated first upper connector member structured and arranged for attachment adjacent said upper side wall portion of said first side wall; and
   ii. an elongated first lower connector member structured and arranged for attachment adjacent said lower side wall portion of said first side wall;
   iii. wherein said first upper connector member and said first lower connector member are structured and arranged to grip said first monocular barrel; and b. a said second connector comprising
   i. an elongated second upper connector member structured and arranged for attachment adjacent said upper side wall portion of said second side wall; and
   ii. an elongated second lower connector member structured and arranged for attachment adjacent said lower side wall portion of said second side wall;
   iii. wherein said second upper connector member and said second lower connector member are structured and arranged to grip said second monocular barrel.

11. The storage system according to claim 10 further comprising a clasp releasably clasping said first upper connector member to said first lower connector member and releasably clasping said second upper connector member to said second lower connector member.

12. The storage system according to claim 11 wherein said clasp comprises a hook-and-loop-type connector.

* * * * *